(12) United States Patent
Yoshida

(10) Patent No.: US 6,775,127 B2
(45) Date of Patent: Aug. 10, 2004

(54) ANODE MEMBER FOR A SOLID ELECTROLYTIC CAPACITOR, METHOD OF PRODUCING THE SAME AND SOLID ELECTROLYTIC CAPACITOR USING THE SAME

(75) Inventor: Katsuhiro Yoshida, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/441,615

(22) Filed: May 20, 2003

(65) Prior Publication Data

US 2003/0218859 A1 Nov. 27, 2003

(30) Foreign Application Priority Data

May 22, 2002 (JP) .......................... 2002-147505

(51) Int. Cl.$^7$ .......................... H01G 9/04; H01G 9/145
(52) U.S. Cl. .......................... 361/528; 361/532
(58) Field of Search .......................... 361/523–541; 156/89.12

(56) References Cited

U.S. PATENT DOCUMENTS 4,520,430 A * 5/1985 Long et al. ............. 361/529
4,574,333 A * 3/1986 Snyder ................... 361/529
5,772,701 A * 6/1998 McMillan et al. ......... 29/25.03
6,351,371 B1 * 2/2002 Yoshida et al. ........... 361/528
6,370,017 B1 * 4/2002 Stenzel et al. ............ 361/524

FOREIGN PATENT DOCUMENTS

JP     59-219923 A    12/1984
JP     2002-50550 A    2/2002

* cited by examiner

Primary Examiner—Dean A. Reichard
Assistant Examiner—Eric Thomas
(74) Attorney, Agent, or Firm—Frishauf, Holtz, Goodman & Chick, P.C.

(57) ABSTRACT

An anode member includes a tantalum foil (1) and a sintered member (2A, 2B) formed thereon. The sintered member has a double-layer structure including a lower sintered layer ($2A_1$, $2B_1$) made of a first material powder having a high sinterability and an upper sintered layer ($2A_2$, $2B_2$) made of a second material powder having a low sinterability. Sintering is performed at a temperature providing good porosity of the upper sintered layer and an over-sintered condition of the lower sintered layer. The first and the second material powders are same in raw material metal and different in average particle size or, alternatively, different in raw material metal and equal in average particle size. Alternatively, the sintered member (2C) has a single-layer structure including a sintered body of a powder mixture of the first and the second material powders.

7 Claims, 6 Drawing Sheets

ANODE MEMBER FOR A SOLID ELECTROLYTIC CAPACITOR, METHOD OF PRODUCING THE SAME AND SOLID ELECTROLYTIC CAPACITOR USING THE SAME

BACKGROUND OF THE INVENTION

This invention claims priority to prior Japanese patent application JP 2002-147505, the disclosure of which is incorporated herein by reference.

This invention relates to an anode member for a solid electrolytic capacitor, a method of producing the same, and a solid electrolytic capacitor using the same and, in particular, to a flat anode member including a thin plate of a valve metal as an anode lead and a sintered member laminated thereon, a method of producing the same, and a solid electrolytic capacitor using the same.

There is known a solid electrolytic capacitor including an anode including a sintered member formed by sintering a powder of a valve metal such as tantalum (Ta). Typically, the sintered member has a cylindrical shape such as a circular cylinder or a rectangular cylinder. For convenience of description, the capacitor of the type will be referred to as a cylindrical element capacitor. On the other hand, Japanese Unexamined Patent Publication No. S59-219923 (JP 59-219923 A) discloses a capacitor using a sintered member of a flat structure. The capacitor includes a thin plate (foil) of a valve metal and a layered sintered member laminated on the thin plate. For convenience of description, the capacitor of the type will be referred to as a foil element capacitor. This invention relates to the sintered member of the foil element capacitor. Hereinafter, the foil element capacitor will be described in conjunction with a tantalum solid electrolytic capacitor by way of example. It is well known that, in a solid electrolytic capacitor using a sintered member formed by sintering a powder of a valve metal, the sintered member electrically serves as an anode of the capacitor. In this connection, the thin plate of the valve metal and the sintered member formed thereon may collectively be called an anode member in the following description. Japanese Unexamined Patent Publication No. 2002-50550 (JP 2000-50550 A) discloses a method of producing an anode element for a tantalum electrolytic capacitor, in which a paste containing metal powder is applied or printed to form an anode element.

Referring to FIG. 1A, a related tantalum foil element solid electrolytic capacitor will be described. The related tantalum foil element solid electrolytic capacitor includes a tantalum foil 1, i.e., a foil of a tantalum metal and a layered sintered member 2 obtained by sintering a tantalum powder as a material powder and laminated on the tantalum foil 1. The layered sintered member 2 of the tantalum powder has small pores formed by sintering and interconnected in a complicated manner. Therefore, the layered sintered member 2 has a very large surfaced area. As described above, the sintered member 2 serves as an anode. On an outer surface of the sintered member 2 and on inner walls of the small pores, a tantalum oxide ($Ta_2O_5$) film (not shown) is formed. The tantalum oxide film serves as a dielectric member of the capacitor. On the tantalum oxide film, a solid electrolyte layer (not shown) is formed. The solid electrolyte layer serves as a cathode of the capacitor. A combination of the sintered member 2 as the anode, the tantalum oxide film as the dielectric member, and the solid electrolyte layer as the cathode forms a fundamental structure of the capacitor.

On the solid electrolyte layer, a conductive substance layer (cathode conductor layer) is formed although not shown in the figure. The cathode conductor layer includes a plurality of layers, for example, a graphite layer and a silver paste layer, successively laminated. To the outermost layer of the cathode conductor layer, a cathode-side terminal (external cathode terminal) 3 for electrical connection to an external circuit is fixedly attached. On the other hand, the tantalum foil 1 partially has an exposed surface on which the sintered member 2 is not formed, as shown at a left side in the figure. To the exposed surface, an anode-side terminal (external anode terminal) 4 for electrical connection to the external circuit is fixedly attached.

An outer resin member 5, for example, made of epoxy resin covers the tantalum foil 1, the layered sintered member 2, and the external cathode and the external anode terminals 3 and 4 except a part of each of the external cathode and the external anode terminals 3 and 4. The part of each of the external cathode and the external anode terminals 3 and 4 led out of the outer resin member 5 is shaped and bent to extend at first along a side wall and then along a bottom surface of the outer resin member 5.

In the foil element solid electrolytic capacitor having the above-mentioned structure, the tantalum foil 1 serves to electrically connect the sintered member 2 as the anode of the capacitor and the external anode terminal 4. Thus, the tantalum foil 1 corresponds to a tantalum wire well known as a so-called "anode lead" in the cylindrical element solid electrolytic capacitor and planted to the cylindrical sintered member.

The tantalum foil element solid electrolytic capacitor mentioned above is generally produced in the following manner. At first, a tantalum powder (a powder of a tantalum metal), a solvent, and a binder are mixed to form a tantalum powder paste. The solvent and the binder are appropriately selected with respect to each other. For example, a water soluble binder is selected for use with a water-based solvent.

Next, on the tantalum foil 1 separately prepared, the tantalum powder paste is printed to form a tantalum powder layer. As a printing mask, a screen mask or a metal mask may be used. In order to reduce a printing thickness, the screen mask is preferable. In order to increase the printing thickness, the metal mask is appropriate.

Then, the tantalum foil 1 with the tantalum powder layer formed thereon is sintered in a high vacuum of, for example, about $10^{-6}$ Torr at a temperature lower than the melting point of the tantalum metal, for example, at a high temperature between about 1300° C. and about 1600° C. Thus, an anode member is obtained.

Thereafter, in the manner similar to the production of the cylindrical element solid electrolytic capacitor, the tantalum oxide film as a dielectric film, the solid electrolyte layer, and the cathode conductor layer are formed. Then, the external cathode and the external anode terminals 3 and 4 are fixedly attached and electrically connected. Furthermore, the outer resin member 5 is formed and the external cathode and the external anode terminals 3 and 4 are shaped.

Specifically, on the inner and the outer surfaces of the anode member obtained by the above-mentioned sintering, a tantalum oxide ($Ta_2O_5$) film, i.e., a thin film of oxide of the tantalum metal as a raw material of the sintered member 2 is formed by anodic oxidation well known in the art. Furthermore, on the tantalum oxide film, the solid electrolyte layer is formed. As a solid electrolyte, use may be made of manganese dioxide obtained by thermal decomposition of manganese nitrate or a conductive polymer such as polypyrrole. In recent years, the conductive polymer is increasingly used as the solid electrolyte because the conductive polymer is smaller in intrinsic resistance so that the capacitor is reduced in equivalent series resistance (ESR) and because a heat insulating reaction is quick so that the capacitor hardly emit smoke or catch fire.

Following the formation of the solid electrolyte layer, the cathode conductor layer is formed. Generally, the cathode conductor layer has a laminate structure including the graphite layer formed on the solid electrolyte layer and the silver paste layer formed on the graphite layer. The cathode conductor layer serves to electrically connect the solid electrolyte layer and the external cathode terminal 3. Furthermore, the cathode conductor layer also serves to protect the dielectric film by relaxing the stress which would be produced during formation of the outer resin member 5 in the subsequent production process and upon mounting the capacitor after it is completed. Between the step of forming the solid electrolyte layer and the step of forming the cathode conductor layer, the tantalum oxide film may be re-formed if necessary. Such re-formation is intended to repair a minor defect caused in the tantalum oxide film due to mechanical and chemical stresses produced during formation of the solid electrolyte layer to thereby achieve a more stable characteristic of the capacitor. The reformation is carried out in the manner substantially similar to the formation of the tantalum oxide film mentioned above. Specifically, the anode member is again applied with an electric voltage in an electrolyte solution.

After formation of the cathode conductor layer, the external cathode terminal 3 is fixedly attached and electrically connected to the cathode conductor layer, for example, by adhesion using a conductive adhesive. To the exposed surface of the tantalum foil 1 which is not covered with the sintered member 2, the external anode terminal 4 is fixedly attached by welding or the like.

Finally, the outer resin member 5 is formed by transfer molding using thermosetting resin such as epoxy resin. The external cathode and the external anode terminals 3 and 4 are shaped as mentioned above. Thus, the related tantalum foil element solid electrolytic capacitor illustrated in FIG. 1A is completed.

As compared with the cylindrical element solid electrolytic capacitor, the above-mentioned foil element solid electrolytic capacitor is advantageous in the following respects. Specifically, the thickness of the anode member can easily be reduced so that the capacitor can advantageously be reduced in thickness and size. Since a contact area between the tantalum foil 1 as the anode lead and the layered sintered member 2 as the anode is increased and the resistance therebetween is reduced, the ESR of the capacitor can be lowered.

The related foil element solid electrolytic capacitor illustrated in FIG. 1A has a characteristic which will presently be described.

Referring to FIG. 1B, illustration is made of a related tantalum foil-type anode member used in the capacitor illustrated in FIG. 1A. The layered sintered member 2 of the anode member has a structure shown in an enlarged view encircled by a broken line. Specifically, the layered sintered member 2 is made of a single kind of material powder which is prepared from a single kind of metal (tantalum in the illustrated example) and which has a single kind of average particle size. The thin plate of the valve metal (tantalum foil 1 in the illustrated example) serving as the anode lead is made of a metal (tantalum in the illustrated example) same as a raw metal material of the material powder of the sintered member 2.

As compared with the cylindrical element solid electrolytic capacitor, the foil element solid electrolytic capacitor has the above-mentioned advantages. On the other hand, the foil element solid electrolytic capacitor is disadvantageous in that production is difficult as compared with the cylindrical element solid electrolytic capacitor. Hereinafter, the disadvantage will be described.

As described above, the anode member of a foil type is obtained by depositing (for example, by printing) the tantalum powder paste on the tantalum foil 1 as the valve metal to form the tantalum powder layer and then sintering the tantalum powder layer.

In the meanwhile, sinterability upon sintering a metal powder, i.e., the degree of coupling or adhesion between particles forming the powder or the degree of growth of the particles is widely different depending upon locations of the particles. Specifically, the sinterability at a boundary between the particles is different from the sinterability at an interface between the particles and a macroscopic metal object such as a metal foil or a metal plate. It is known that, even at a same temperature, sintering is quick at the interface between the particles while the growth or the adhesion of the particles is difficult or slow between the particles and the metal foil. It is assumed here that, in the related foil type anode member illustrated in FIG. 1B, the sintering temperature is determined focusing upon the porosity of the sintered member 2. Then, an excellent sintered condition is obtained in a region occupied by the tantalum powder (a main body of the sintered member 2). On the other hand, at the interface between the tantalum foil 1 and the sintered member 2, sintering is insufficient so that adhesion or bond between the sintered member 2 and the tantalum foil 1 is weak. During handling in a production process, the sintered member 2 may often be separated or released from the tantalum foil 1. In addition, the capacitor is deteriorated in leakage current characteristic.

In order to avoid occurrence of the above-mentioned trouble during the production process and the deterioration in characteristic of the capacitor as a result of focusing upon the porosity of the sintered member 2, the sintering temperature is elevated so as to enhance the adhesion or the bond at the interface between the tantalum foil 1 and the powder layer (sintered member 2). In this event, however, over-sintering occurs in the main body of the sintered member 2 so that the porosity is lost and the capacitance of the capacitor per unit weight is decreased. Such over-sintering of the sintered member 2 results in deformation, such as warp, of the anode member and easy occurrence of shape error.

On the other hand, the cylindrical anode member does not use the foil but uses a metal wire as the anode lead. In the cylindrical anode member, the anode lead is enclosed in the tantalum powder. In addition, the tantalum powder is pressed and formed into a cylindrical body by compression molding under pressure. Therefore, contact between the anode lead and the tantalum powder is enhanced. Thus, at an initial stage prior to sintering, the bond between the anode lead and the tantalum powder is already strengthened. From the above-mentioned reasons, strong bond is achieved between the anode lead and the sintered member as compared with the foil-type electrode member even if the sintering is carried out at the temperature determined focusing upon the porosity, i.e., at a relatively low temperature.

SUMMARY OF THE INVENTION

Therefore, it is an object of this invention to provide a foil-type anode member for a solid electrolytic capacitor, which includes a thin plate of a valve metal as an anode lead and a layered sintered member obtained by forming on the thin plate a powder layer of a valve metal powder as a material powder to be sintered and then sintering the powder layer and which is improved in bonding strength between the sintered member and the thin plate as the anode lead in case where sintering is carried out at a temperature suitable for porosity of the sintered member.

According to this invention, there is provided an anode member for a solid electrolytic capacitor, comprising a thin plate of a valve metal and a layered sintered member obtained by forming on the thin plate a powder layer of a valve metal powder as a material powder to be sintered and then sintering the powder layer, wherein the layered sintered member has a multi-layer structure including a plurality of sintered layers different in material powder and in sintered condition.

In the layered sintered member having a multi-layer structure, the sintered layers include a heavily-sintered layer and a lightly-sintered layer as a lower layer and an upper layer, respectively.

DESCRIPTION OF THE PREFERRED EMBODIMENTS

Figure 1A:
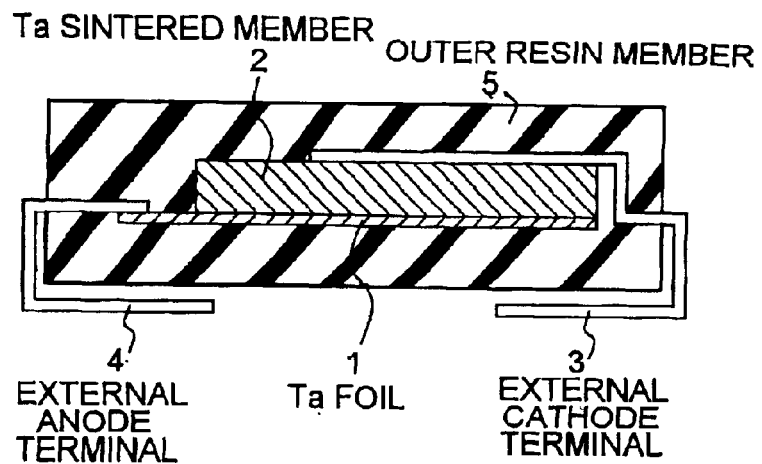
FIG. 1A is a sectional view of a related tantalum foil element solid electrolytic capacitor.

Next, description will be made of several embodiments of this invention with reference to the drawing.

Figure 1B:
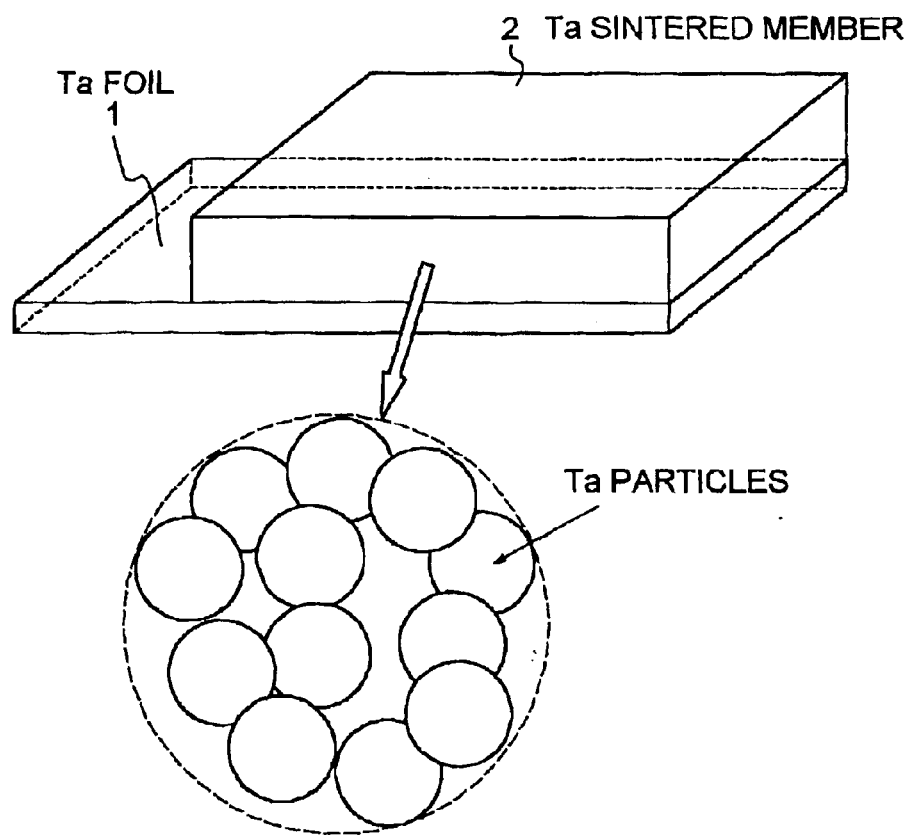
FIG. 1B is a view showing a related tantalum foil-type anode member used in the capacitor illustrated in FIG. 1A.
Figure 2:
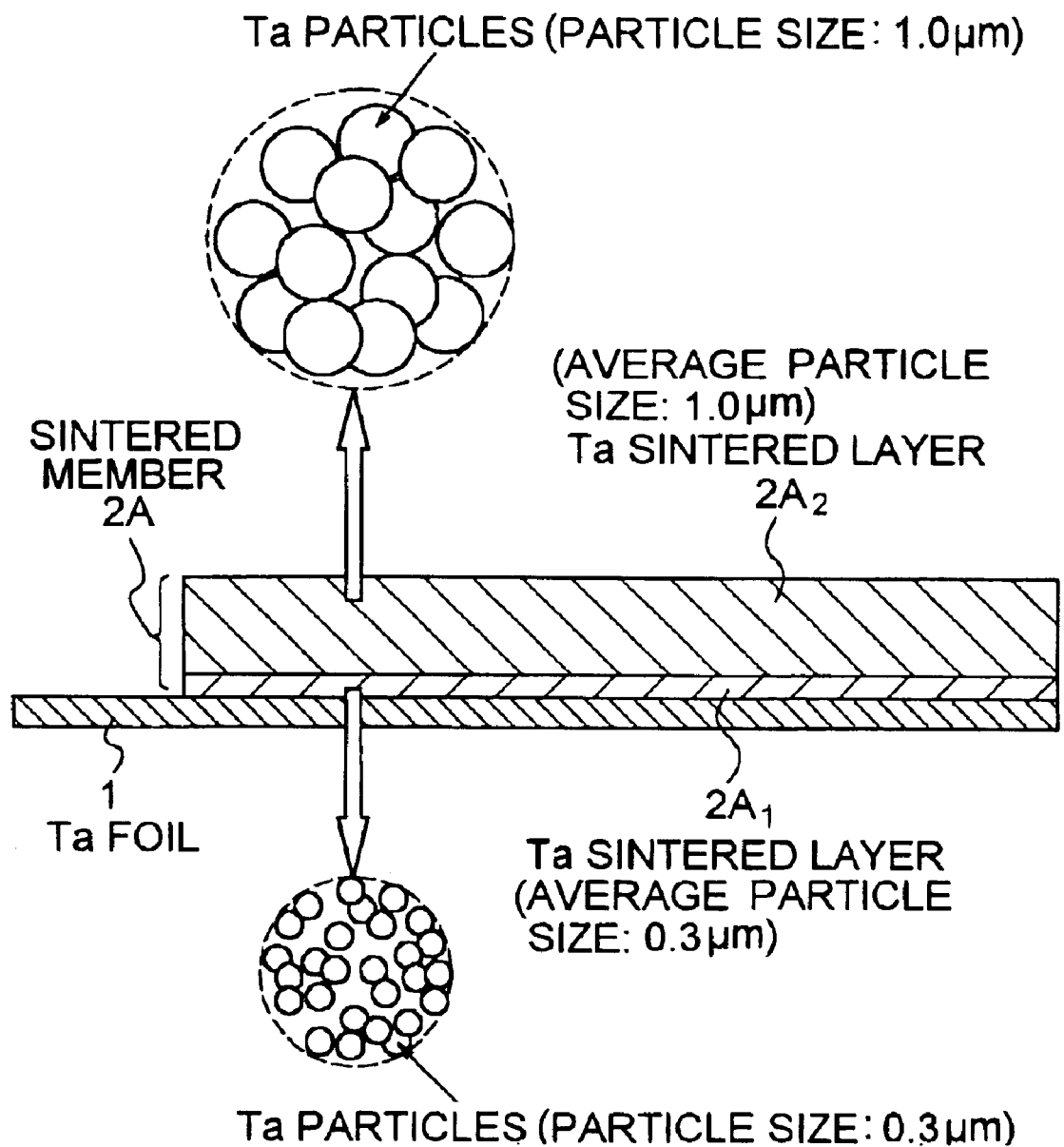
FIG. 2 is a sectional view of a tantalum foil-type anode member according to a first embodiment of this invention.

Referring to FIG. 2, a tantalum foil-type anode member according to a first embodiment of this invention includes a tantalum foil 1 and a sintered member 2A formed thereon. The foil-type anode member in this embodiment is different in structure from the related foil-type anode member illustrated in FIG. 1B in the following respects. The sintered member 2A has a two-layer structure including a first or lower sintered layer $2A_1$ and a second or upper sintered layer $2A_2$ formed thereon. The first and the second sintered layers $2A_1$ and $2A_2$ are different in material powder. Specifically, the first and the second sintered layers $2A_1$ and $2A_2$ are similar to each other in that a tantalum powder is used as the material powder but are different from each other in average particle size of the material powder.

The present inventor prepared a tantalum foil element solid electrolytic capacitor using the foil-type anode member according to the first embodiment. A production process of the capacitor is generally similar to that of the related tantalum foil element solid electrolytic capacitor but is different in a part related to production of the anode member. The different part will hereinafter be described in detail.

At first, preparation was made of two kinds of pastes each of which contained a tantalum powder, i.e., a powder of a tantalum metal. The two pastes were different in average particle size of the tantalum powder contained therein. One of the paste included the tantalum powder having an average particle size of 1.0 $\mu$m while the other paste included the tantalum powder having an average particle size of 0.3 $\mu$m. In this embodiment, each paste was prepared by diluting an acrylic binder with toluene to obtain an organic binder solution and adding the organic binder solution to each of the two kinds of tantalum powders. In each of the pastes, the amount of the binder was equal to 10% with respect to the weight of the powder and the amount of toluene was adjusted so that the viscosity of the paste falls within a range of 15000±1000 mPa·s. Hereinafter, the paste including the tantalum powder having an average particle size of 1.0 $\mu$m will be referred to as a paste T(1.0) while the paste including the tantalum powder having an average particle size of 0.3 $\mu$m will be referred to as a paste T(0.3).

Next, on the tantalum foil 1 separately prepared, the paste T(0.3) of the tantalum powder smaller in average particle size was printed as a first layer by the use of a screen mask so that the thickness after drying would be equal to 8 $\mu$m. Then, the paste was dried in a vacuum at a temperature of 85° C. for 30 minutes. Thereafter, on the above-mentioned paste T(0.3) printed as mentioned above, the paste T(1.0) of the tantalum powder greater in average particle size was printed as a second layer by the use of a metal mask so that the thickness after drying would be equal to 200 $\mu$m. Then, the paste was dried in a vacuum at a temperature of 85° C. for 30 minutes, like in the first layer.

The tantalum foil 1 with the above-mentioned two tantalum powder layers formed thereon was sintered in a vacuum of $10^{-6}$ Torr at a temperature of 1400° C. for 30 minutes. Thus, the foil-type anode member illustrated in FIG. 2 was obtained.

Thereafter, the anode member having the two-layer structure was subjected to formation of the tantalum oxide film by anodic oxidation, formation of the solid electrolyte layer, and re-formation of the tantalum oxide film. These steps were carried out in the manner similar to those in the production process of the related foil element solid electrolytic capacitor. The producing conditions were as follows. The anodic oxidation was carried out by the use of a 0.6% phosphoric acid aqueous solution as an electrolyte solution at a voltage of 16V. Polypyrrole was used as the solid electrolyte. For the re-formation, a 0.1% phosphoric acid aqueous solution was used and a voltage of 16V was applied.

Thereafter, in the manner similar to the production process of the related foil element solid electrolytic capacitor, formation of a cathode conductor layer, formation of external cathode and external anode terminals (3 and 4 FIG. 1A), formation of an outer resin member (5 in FIG. 1A) were carried out to complete the tantalum foil element solid electrolytic capacitor in this embodiment. During the production process, separation or release of the sintered member 2A did not occur. The capacitor completed as mentioned above had an excellent leakage current characteristic.

For comparison, the related foil-type anode member illustrated in FIG. 1B was prepared by the use of the above-mentioned paste T(1.0) of the tantalum powder having an average particle size of 1.0 µm. In the related foil-type anode member, the sintered member 2 had a single-layer structure and a thickness of 200 µm. Sintering was carried out at a temperature of 1550° C. in order to prevent separation of the tantalum foil 1 and the sintered member 2.

Figure 3A:
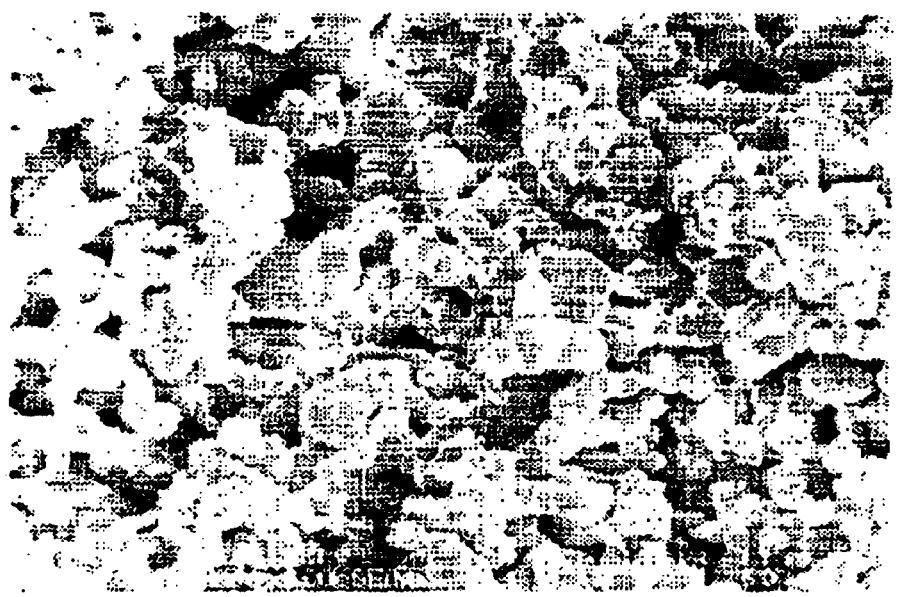
FIG. 3A shows an image of a SEM photograph of a sintered member in the tantalum foil-type anode member illustrated in FIG. 2.
Figure 3B:
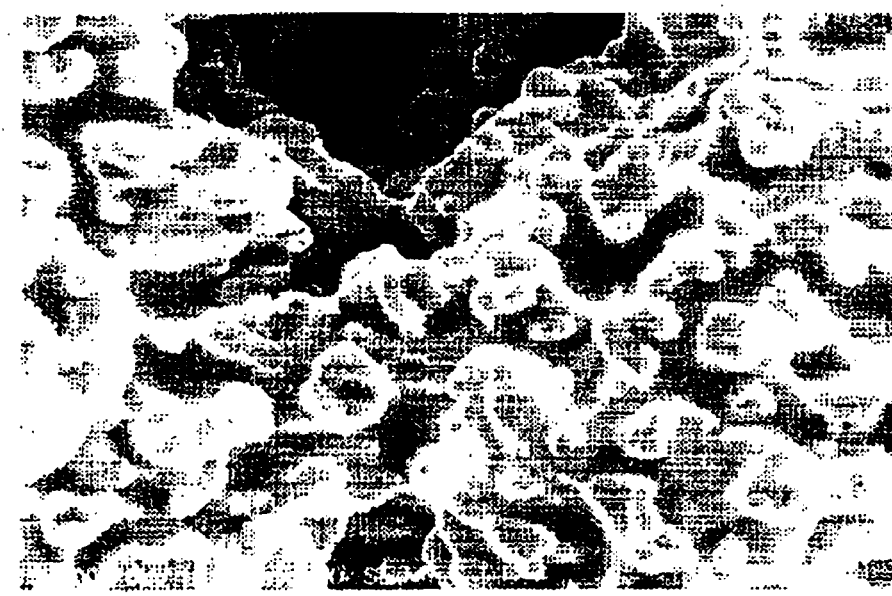
FIG. 3B shows an image of a SEM photograph of a sintered member in the related tantalum foil-type anode member illustrated in FIG. 1B.

FIG. 3A shows a scanning electron micrograph (SEM) of the upper sintered layer $2A_2$ in the foil-type anode member according to the first embodiment. FIG. 3B shows a SEM of the sintered layer 2 of the related foil-type anode member. In both of the sintered member 2A of the anode member according to the first embodiment and the sintered member 2 of the related anode member, separation or release of the sintered member from the tantalum foil 1 or deformation of the anode member was not observed. Comparing these SEMs, however, the sintered member 2 prepared by the known technique was over-sintered. As illustrated in FIG. 3B, the powder was melted to grow into large massive particles so that the porosity is decreased. On the other hand, in the anode member according to the first embodiment, a sufficient gap is kept between adjacent particles in the upper sintered layer $2A_2$ so that excellent porosity is maintained. This is because, although the tantalum powder having an average particle size of 1.0 µm is used in both of the upper sintered layer $2A_2$ in the anode member of the first embodiment and the sintered member 2 in the related anode member, the sintering temperature is 1400° C. in the anode member of the first embodiment and the sintering temperature is as high as 1550° C. in the related anode member.

For the tantalum powder having an average particle size of 1.0 µm, the sintering temperature of 1400° C. provides a sintered condition favorable in view of the porosity. Therefore, in the first embodiment in which the sintering was carried out at 1400° C., the upper sintered layer $2A_2$ using the paste T(1.0) exhibited good porosity. On the other hand, the lower sintered layer $2A_1$ using the paste T(0.3) was over-sintered. Generally, the sinterability of metal powder depends upon the size of powder particles. Even at the same sintering temperature, the powder smaller in particle size is highly sintered as compared with the powder greater in particle size. As a result, bonding strength between the lower sintered layer $2A_1$ and the tantalum foil 1 is greater than that which would be obtained if the upper sintered layer $2A_2$ greater in average particle size is in direct contact with to the tantalum foil 1.

The lower sintered layer $2A_1$ over-sintered is very thin as compared with the upper sintered layer $2A_2$. Therefore, over-sintering stays in a restricted area (i.e., the lower sintered layer $2A_1$) between the tantalum foil 1 and the upper sintered layer $2A_2$ and does not spread to the upper sintered layer $2A_2$. Thus, the upper sintered layer $2A_2$ as a main factor exhibiting the capacitance is sintered into a proper sintered condition. In addition, strong bond with the tantalum foil 1 is assured by the lower sintered layer $2A_1$ in an over-sintered condition interposed between the tantalum foil 1 and the upper sintered layer $2A_2$ so that separation is prevented to occur.

On the other hand, if the sintering temperature in the related anode member is changed to 1400° C. equal to that in the anode member of the first embodiment, the sintered member 2 having a single-layer structure including the layer of the past T(1.0) alone has a desired sintered condition in its main body in view of the porosity. However, at the interface between the tantalum foil 1 and the sintered member 2, adhesion and bond therebetween do not make sufficient progress so that the sintered member 2 is easily separated from the tantalum foil 1. If the sintering temperature is elevated to 1550° C. in order to prevent such separation of the sintered layer 2, the main body of the sintered member 2 is over-sintered as shown in the SEM photograph in FIG. 3B so that the porosity is decreased.

In the first embodiment, the sintered member 2A has a double-layer structure including the lower and the upper sintered layers $2A_1$ and $2A_2$ different in sintered condition and the lower sintered layer $2A_1$ in direct contact with the tantalum foil 1 is highly sinterable. With this structure, the main body of the sintered member 2A has good porosity while the bonding strength between the tantalum foil 1 and the sintered member 2A is increased.

In the first embodiment mentioned above, the two sintered layers are same in raw material metal of the material powder but are different in average particle size of the material powder so as to exhibit different sintered conditions. It is noted here that the difference in sintered condition can be exhibited if the two sintered layers are equal in average particle size of the material powder to each other but are different in valve metal as the raw material metal from each other, as will be described in the following.

Figure 4:
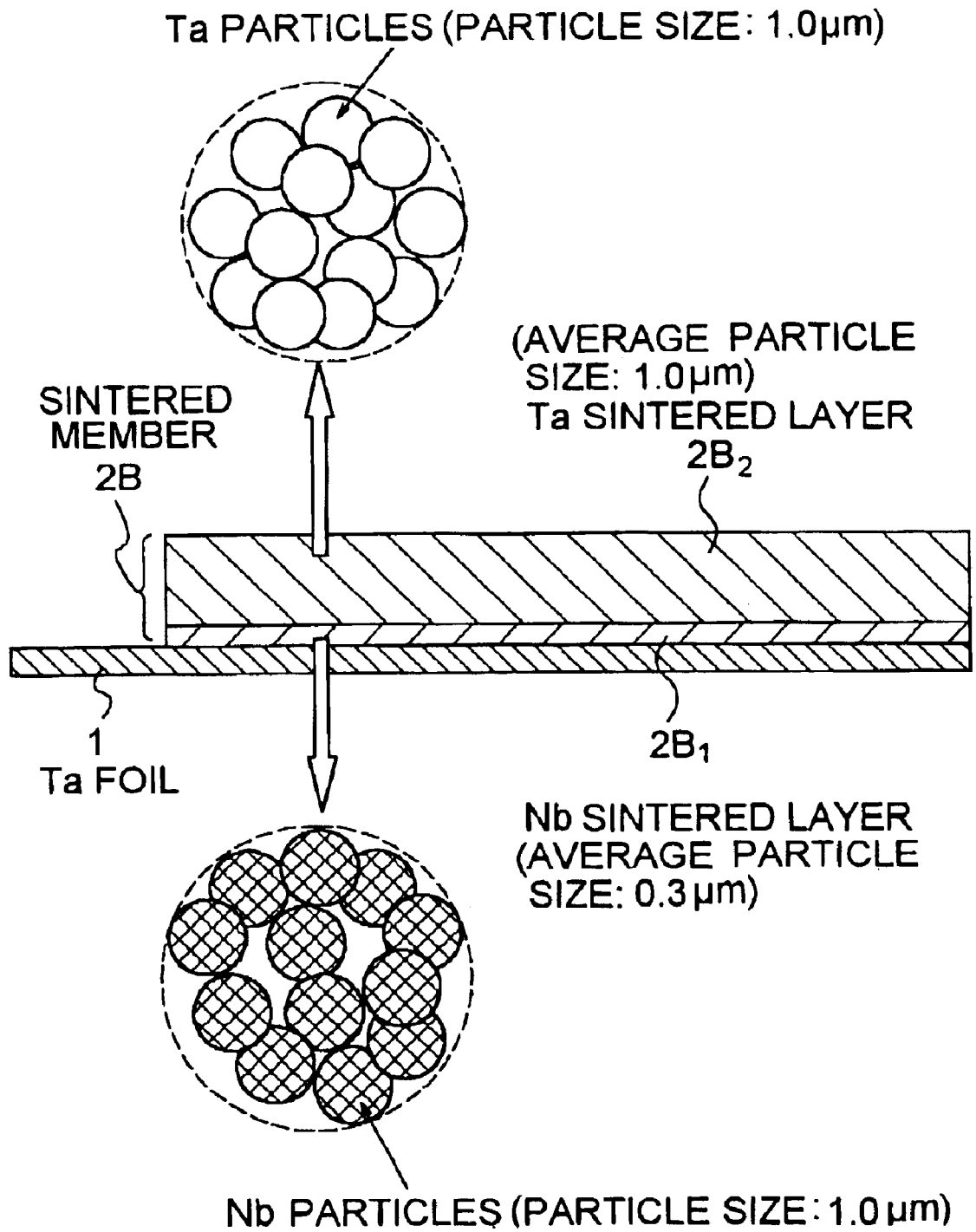
FIG. 4 is a sectional view of a tantalum foil-type anode member according to a second embodiment of this invention.

Referring to FIG. 4, a foil-type anode member according to a second embodiment of this invention includes a tantalum foil 1 and a sintered member 2B formed thereon. The sintered member 2B has a double-layer structure including lower and upper sintered layers $2B_1$ and $2B_2$. The lower sintered layer $2B_1$ includes a sintered product of a niobium powder, i.e., a powder of a niobium metal (Nb) while the upper sintered layer $2B_2$ includes a sintered product of a tantalum powder, i.e., a powder of a tantalum metal (Ta). The second embodiment is different from the first embodiment in that the upper and the lower sintered layers are different in metal species and that the average particle size of the niobium powder is equal to that of the tantalum powder as shown in enlarged views encircled by broken lines in FIG. 4.

The present inventor prepared a tantalum foil element solid electrolytic capacitor using the anode member according to the second embodiment. A production process of the capacitor is generally similar to that in the first embodiment but is different in a part related to production of the anode member. The different part will hereinafter be described in detail.

At first, preparation was made of two kinds of pastes one of which contained a tantalum powder, i.e., a powder of a tantalum metal and the other of which contained a niobium powder, i.e., a powder of a niobium metal. In the two pastes, the powders contained therein were produced from different raw material metals but were equal in average particle size to each other, i.e., equal to 1.0 µm. An organic binder solution was prepared by diluting an acrylic binder with toluene and added to each of the tantalum powder and the niobium powder to form a paste. The paste using the tantalum powder was same as the paste T(1.0) in the first embodiment. In the paste using the niobium powder, the amount of the binder was equal to 5% with respect to the weight of the powder and the amount of toluene was adjusted so that the viscosity of the paste was equal to that of the paste T(1.0) of the tantalum powder. Hereinafter, the paste of the niobium powder will be referred to as a paste N(1.0).

Next, on the tantalum foil 1 separately prepared, the paste N(1.0) of the niobium powder was printed as a first layer by the use of a screen mask so that the thickness after drying would be equal to 8 µm. Then, the paste was dried in vacuum at a temperature of 85° C. for 30 minutes. Thereafter, on the above-mentioned paste N(1.0) printed as mentioned above, the paste T(1.0) of the tantalum powder was printed as a second layer by the use of a metal mask so that the thickness after drying would be equal to 200 μm. Then, the paste was dried in vacuum at a temperature of 85° C. for 30 minutes, like in the first layer.

The tantalum foil 1 with the first and the second layers of the niobium powder and the tantalum powder formed thereon was sintered in a vacuum of $10^{-6}$ Torr at a temperature of 1400° C. for 30 minutes. Thus, the foil-type anode member illustrated in FIG. 4 was obtained.

Thereafter, in the conditions same as those in the first embodiment, the foil-type anode member thus obtained was subjected to formation of a tantalum oxide film by anodic oxidation, formation of a solid electrolyte layer, formation of a cathode conductor layer, connection of external cathode and external anode terminals, formation of an outer resin member, and shaping of the external terminals to complete the tantalum foil element solid electrolytic capacitor according to the second embodiment. During production, separation between the tantalum foil 1 and the sintered member 2B was not observed. The capacitor had an excellent leakage current characteristic.

The reason is as follows. The niobium metal has a melting point of 2470° C. which is lower than that (2996° C.) of the tantalum metal. Therefore, when the tantalum powder and the niobium powder having the same average particle size are sintered at the same sintering temperature, the niobium powder is rapidly sintered as compared with the tantalum powder. Sintering at 1400° C. which is appropriate for the tantalum powder having an average particle size of 1.0 μm (in order to provide good porosity) brings about an over-sintered condition for the niobium powder. In the second embodiment, over-sintering in the lower sintered layer $2B_1$ of the niobium powder in direct contact with the tantalum foil 1 serves to increase bonding strength between the tantalum foil 1 and the sintered member $2B_1$ like the over-sintering in the lower sintered layer $2A_1$ of the tantalum powder smaller in average size in the first embodiment.

In each of the first and the second embodiments, the sintered member has a double-layer structure including two sintered layers different in sintered condition. Alternatively, a mixture of two kinds of powders different in sinterability may be used as a raw material powder to be sintered. In this case also, good porosity is kept and bonding strength between the sintered member and the tantalum foil can be improved.

Figure 5:
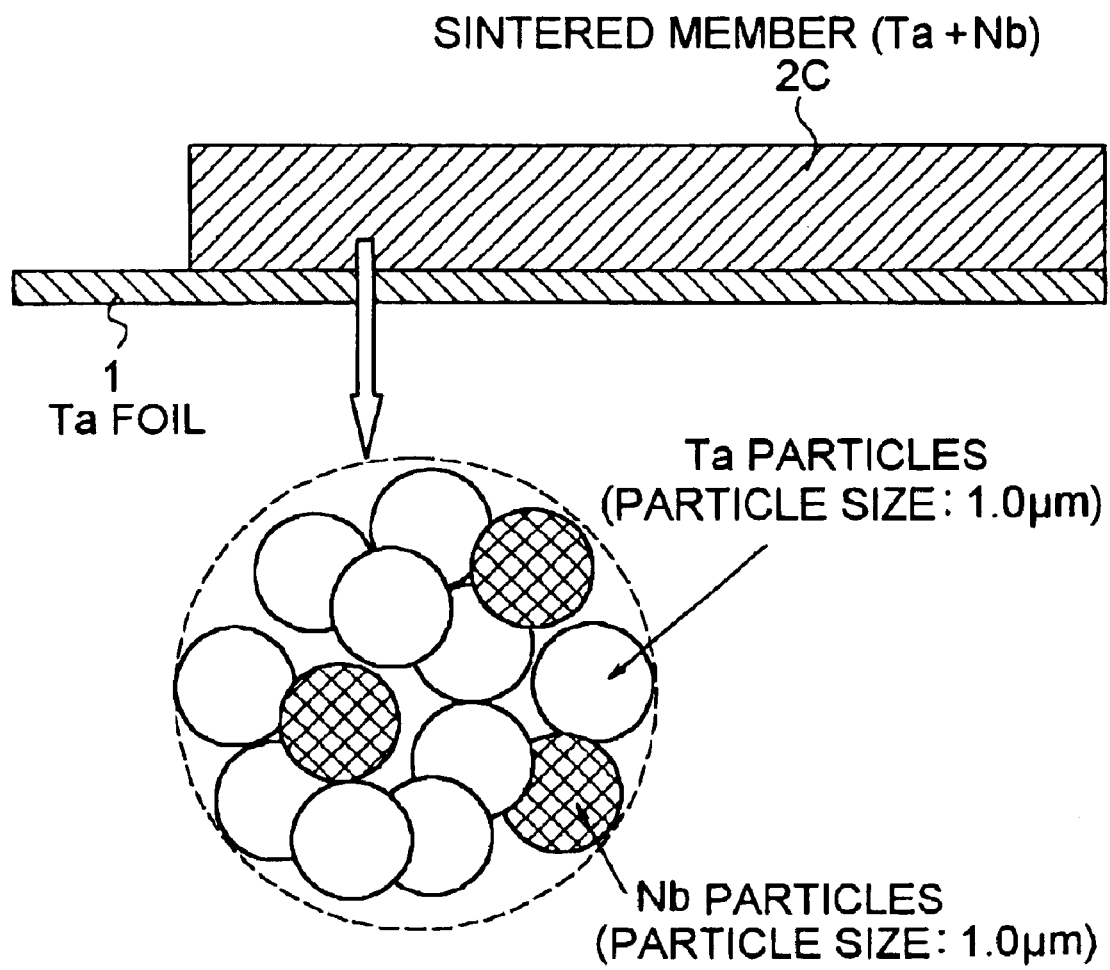
FIG. 5 is a sectional view of a tantalum foil-type anode member according to a third embodiment of this invention.

Referring to FIG. 5, a foil-type anode member according to a third embodiment of this invention includes a tantalum foil 1 and a sintered member 2C formed thereon. The foil-type anode member in this embodiment is different from the first and the second embodiments in the following respect. Specifically, the sintered member 2C has a single-layer structure and is made from a material powder which is a mixture of a tantalum powder and a niobium powder equal in average particle size as shown in an enlarged view encircled by a broken line in FIG. 5.

A tantalum foil element solid electrolytic capacitor using the anode member according to the third embodiment was prepared in the following manner. At first, preparation was made of a powder mixture of a tantalum powder having an average particle size of 1.0 μm and a niobium powder having an average particle size of 1.0 μm. The ratio of the tantalum powder and the niobium powder is 9:1 in weight ratio. The powder mixture, a solvent, and a binder were mixed into a paste. The amount of the binder was 10% with respect to the weight of the powder mixture. The amount of toluene was adjusted so that the viscosity of the paste falls within a range of 15000±1000 mPa·s.

Next, on the tantalum foil 1, the paste of the powder mixture was printed by the use of a metal mask so that the thickness after drying would be equal to 200 μm. Then, the paste was dried at a temperature of 85° C. for 30 minutes.

Thereafter, in the manner similar to the first and the second embodiments, sintering was carried out in a vacuum of $10^{-6}$ Torr at a temperature of 1400° C. for 30 minutes. Thus, the foil-type anode member illustrated in FIG. 5 was obtained.

Thereafter, in the conditions same as those in the first and the second embodiments, the foil-type anode member thus obtained was subjected to formation of a tantalum oxide film by anodic oxidation, formation of a solid electrolyte layer, formation of a cathode conductor layer, connection of external cathode and external anode terminals, formation of an outer resin member, and shaping of the external terminals to complete the tantalum foil element solid electrolytic capacitor according to the third embodiment. During production, separation between the tantalum foil 1 and the sintered member 2C was not observed. The capacitor had an excellent leakage current characteristic.

The third embodiment is different from the second embodiment in that sintered particles of the niobium powder greater in sinterability are uniformly distributed among sintered particles of the tantalum powder smaller in sinterability. Niobium particles in contact with the tantalum foil 1 exhibit over-sinterability to promote adhesion and bond with the tantalum foil 1 so that the effect similar to that in the first or the second embodiment is achieved. However, as compared with the first and the second embodiments, the number of particles of the over-sinterable powder (i.e., the niobium powder) present at and around an interface with the tantalum foil 1 is reduced. Correspondingly, the effect of improving the bonding strength between the sintered member 2C and the tantalum foil 1 is decreased to some extent. In addition, the niobium particles are distributed throughout a main body of the sintered member 2C so that over-sintering occurs also in the main body of the sintered member 2C to sacrifice the capacitance of the capacitor to some extent. Thus, the foil-type anode member according to the third embodiment is not equivalent in effect to that according to the first or the second embodiment. However, the third embodiment requires only one kind of paste and only one printing step to print the paste. Therefore, the production process is simplified. Thus, the third embodiment is superior to the first or the second embodiment in view of the production.

Figure 6:
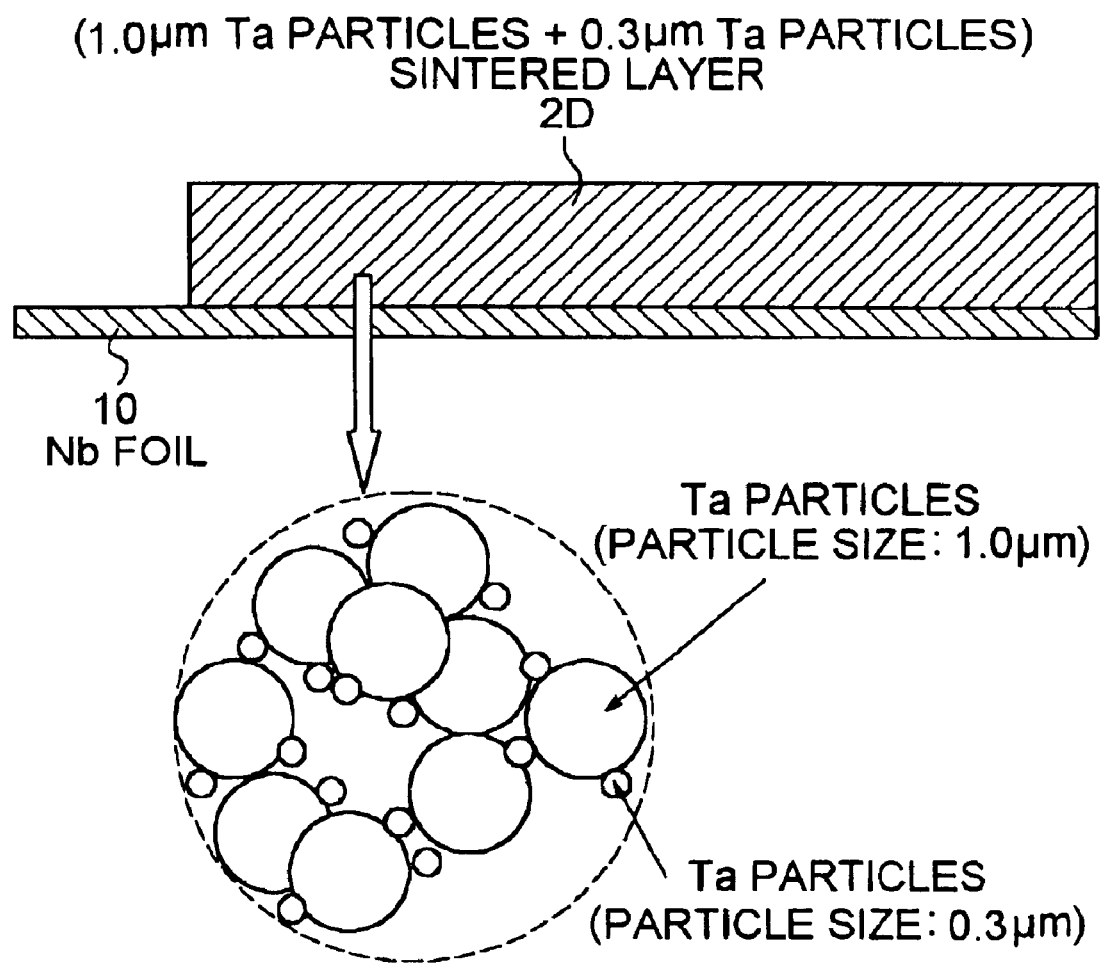
FIG. 6 is a sectional view of a tantalum foil-type anode member according to a fourth embodiment of this invention.

Referring to FIG. 6, a foil-type anode member according to a fourth embodiment of this invention is a modification of the third embodiment. The foil-type anode member according to the fourth embodiment includes a niobium foil 10 and a sintered member 2D formed thereon. The sintered member 2D has a single-layer structure including a mixture of two kinds of sintered particles of material powders different in sinterability, like in the third embodiment. However, this embodiment is different from the third embodiment in that the two kinds of material powders different in sinterability are made of a same valve metal (tantalum) but are different in average particle size. Unlike any of the first through the third embodiments, the foil 10 as an anode lead is not made of tantalum used in the foregoing embodiments but is made of a niobium metal.

A tantalum foil element solid electrolytic capacitor using the anode member according to the fourth embodiment was prepared in the following manner. At first, preparation was made of a powder mixture of a tantalum powder having an average particle size of 1.0 μm and another tantalum powder having an average particle size of 0.3 μm. The ratio of the tantalum powder having an average particle size of 1.0 μm and the tantalum powder having an average particle size of 0.3 μm is 9:1 in weight ratio. The powder mixture, a solvent, and a binder were mixed into a paste. The amount of the binder was 10% with respect to the weight of the powder mixture. The amount of toluene was adjusted so that the viscosity of the paste falls within a range of 15000±1000 mPa·s.

Thereafter, like in the third embodiment, the paste of the powder mixture was printed on the niobium foil 1 by the use of a metal mask so that the thickness after drying would be equal to 200 μm. Then, the paste was dried at a temperature of 85° C. for 30 minutes.

Furthermore, in the manner similar to the third embodiment, sintering was carried out in a vacuum of $10^{-6}$ Torr at a temperature of 1400° C. for 30 minutes. Thus, the foil-type anode member illustrated in FIG. 6 was obtained.

Thereafter, in the conditions same as those in the first through the third embodiments, the foil-type anode member thus obtained was subjected to formation of a tantalum oxide film by anodic oxidation, formation of a solid electrolyte layer, formation of a cathode conductor layer, connection of external cathode and external anode terminals, formation of an outer resin member, and shaping of the external terminals to complete the tantalum foil element solid electrolytic capacitor according to the fourth embodiment. During production, separation between the tantalum foil 1 and the sintered member 2D was not observed. The capacitor had an excellent leakage current characteristic.

In the fourth embodiment, particles of the tantalum powder having an average particle size of 0.3 μm and distributed in the sintered member 2D at and around an interface with the niobium foil 10 serve to strengthen the bond between the sintered member 2D and the niobium foil 10. Since the foil 10 is made of the niobium metal having a melting point lower than that of the tantalum metal, the adhesion and the bond between the foil 10 and the sintered member 2D are strengthened in this respect also.

As described above, in the anode member for a solid electrolytic capacitor including a thin plate of a valve metal as an anode lead and a layered sintered member formed thereon and obtained by forming a layer of a valve metal powder as a material powder to be sintered and then sintering the powder layer, it is possible according to this invention to increase the bonding strength between the sintered member and the thin plate of the valve metal in case where sintering is carried out at an appropriate temperature in view of the porosity of the sintered member.

What is claimed is:

1. An anode member for a solid electrolytic capacitor, said anode member comprising:

a thin plate of a valve metals; and a layered sintered member formed on said thin plate and obtained by forming a layer of a valve metal powder as a material powder to be sintered and then sintering said powder layer, wherein said layered sintered member has a multi-layer structure comprising a plurality of sintered layers different in material powder and different in sintered condition;

wherein said sintered layers of the layered sintered member comprise a heavily sintered layer and a lightly sintered layer as a lower layer and an upper layer, respectively; and wherein said lower layer is nearer to said thin plate than to said upper layer, and said heavily sintered layer has a thickness less than a thickness of said lightly sintered layer.

2. The anode member as claimed in claim 1, wherein said sintered layers of the layered sintered member different in sintered condition comprise material powders of a same raw material metal but different average particle size.

3. The anode member as claimed in claim 1, wherein said layered sintered member with a multi-layer structure comprises a first sintered layer laminated on said thin plate in tight contact therewith, and a second sintered layer laminated on said first sintered layer in tight contact therewith; and wherein said second sintered layer comprises a sintered product of a material powder which comprises a same raw material metal as a material powder of said first sintered layer and which is greater in average particle size than the material powder of said first sintered layer.

4. The anode member as claimed in claim 1, wherein said sintered layers of the layered sintered member different in sintered condition copmrise material powders which are different in raw material metal from one another and equal in average particle size.

5. The anode member as claimed in claim 1, wherein said layered sintered member of a multi-layer structure comprises a first sintered layer laminated on said thin plate in tight contact therewith, and a second sintered layer laminated on said first sintered layer in tight contact therewith;

wherein said first sintered layer comprises a sintered product of a material powder which comprises a powder of a first kind of valve metal having a predetermined melting point; and wherein said second sintered layer comprises a sintered product of a material powder which comprises a powder of a second kind of valve metal having a melting point higher than the melting point of the first kind of valve metal and which has an average particle size equal to an average particle size of the material powder of said first sintered layer.

6. An anode member as claimed in claim 5, wherein said first kind of valve metal comprises Nb and said second kind of valve metal comprises Ta.

7. A solid electrolytic capacitor comprising the anode member claimed in claim 1.

* * * * *

UNITED STATES PATENT AND TRADEMARK OFFICE
CERTIFICATE OF CORRECTION

PATENT NO. : 6,775,127 B2
DATED : August 10, 2004
INVENTOR(S) : Katsuhiro Yoshida It is certified that error appears in the above-identified patent and that said Letters Patent is hereby corrected as shown below:

Column 12,
Line 12, delete "to"; and
Line 33, change "copmrise" to -- comprise --.

Signed and Sealed this

Twenty-first Day of December, 2004

JON W. DUDAS
*Director of the United States Patent and Trademark Office*